US 6,697,808 B1

(12) United States Patent
Hurwood et al.

(10) Patent No.: US 6,697,808 B1
(45) Date of Patent: Feb. 24, 2004

(54) METHOD AND SYSTEM FOR PERFORMING ADVANCED OBJECT SEARCHING OF A METADATA REPOSITORY USED BY A DECISION SUPPORT SYSTEM

(75) Inventors: William Hurwood, Washington, DC (US); Benjamin Z. Li, Great Falls, VA (US); Abhimanyu Warikoo, New York, NY (US)

(73) Assignee: MicroStrategy, Inc., McLean, VA (US)

( * ) Notice: Subject to any disclaimer, the term of this patent is extended or adjusted under 35 U.S.C. 154(b) by 217 days.

(21) Appl. No.: 09/883,172

(22) Filed: Jun. 19, 2001

(51) Int. Cl.[7] .............................. G06F 17/30
(52) U.S. Cl. ....................... 707/10; 707/103 R
(58) Field of Search ................. 707/1, 2, 3, 4, 707/10, 100, 101, 102, 200, 103 R

(56) References Cited

U.S. PATENT DOCUMENTS

| | | | |
|---|---|---|---|
| 4,688,195 A | | 8/1987 | Thompson |
| 4,829,423 A | | 5/1989 | Tennant |
| 5,197,005 A | | 3/1993 | Shwartz |
| 5,276,870 A | | 1/1994 | Shan |
| 5,418,943 A | | 5/1995 | Borgida |
| 5,421,008 A | | 5/1995 | Banning |
| 5,555,403 A | | 9/1996 | Cambot |
| 5,584,024 A | | 12/1996 | Shwartz |
| 5,664,182 A | | 9/1997 | Nirenberg |
| 5,692,181 A | | 11/1997 | Anand |
| 5,864,856 A | | 1/1999 | Young |
| 5,890,167 A | | 3/1999 | Bridge |
| 5,914,878 A | | 6/1999 | Yamamoto |
| 5,970,493 A | | 10/1999 | Shoup |
| 6,073,129 A | * | 6/2000 | Levine et al. ............ 707/4 |
| 6,108,657 A | | 8/2000 | Shoup |
| 6,151,601 A | * | 11/2000 | Papierniak et al. ........ 707/10 |
| 6,154,766 A | | 11/2000 | Yost |
| 6,247,008 B1 | | 6/2001 | Cambot |
| 6,279,033 B1 | | 8/2001 | Selvarajan |
| 6,374,252 B1 | * | 4/2002 | Althoff et al. .......... 707/102 |

OTHER PUBLICATIONS

MicroStrategy Announces DSS Agent 5.1, Industry's Leading ROLAP Interface Extends its Reporting Functionality, provides Performance Enhancements & Offers Support for Informatica's PowerMart.

Robert C. Stern, Bruce M. Anderson and Craig W. Thompson, A Menu–Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20–24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp 151–158.

(List continued on next page.)

Primary Examiner—Diane D. Mizrahi
(74) Attorney, Agent, or Firm—Hunton & Williams LLP

(57) ABSTRACT

Methods and systems are provided for use in searching a metadata repository used to store metadata objects relating to data stored in a storage device of a decision support system. In embodiments of the invention, a search object is submitted to an object server by a requestor. The object server may search itself for objects meeting the search criteria. If unsuccessful, the search object may be sent to a metadata server which uses a metadata search engine to search the metadata repository. Results of the search may be returned to the requestor by the object server.

18 Claims, 6 Drawing Sheets

OTHER PUBLICATIONS

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu–Based Natural Language Interfaces To Databases, Proceedings of the Ninth International Conference on Very Large Data Bases, Florence, Italy, Oct. 31–Nov. 2, 1983, pp 43–55.

Craig W. Thompson, John Kolts, and Kenneth W. Ross, A Toolkit for Building "Menu–Based Natural Language" Interfaces, Texas Instruments Incorporated, P. O. Box 226015, MS 238, Dallas, Texas 75265, 1985.

Craig Warren Thompson, M.A., B.A., Using Menu–Based Natural Language Understanding to Avoid Problems Associated with Traditional Natural Language Interfaces to Databases, Dissertation Presented to the Faculty of the Graduate School of the University of Texas at Austin, May 1984.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on CD).

Exel Add–In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy on enclosed CD).

* cited by examiner

METHOD AND SYSTEM FOR PERFORMING ADVANCED OBJECT SEARCHING OF A METADATA REPOSITORY USED BY A DECISION SUPPORT SYSTEM

FIELD OF THE INVENTION

This invention relates to a decision support system that uses a metadata retrieval system to support retrieval of information from one or more data storage devices.

BACKGROUND OF THE INVENTION

Reporting systems such as decision support systems have been developed to efficiently retrieve selected information from data warehouses. One type of decision support system is an on-line analytical processing system ("OLAP"). In general, OLAP systems analyze the data from a number of different perspectives and support complex analyses of large input data sets. OLAP systems generate output upon execution of a report that includes a template to indicate the way to present the output and a filter to specify the conditions of data on which the report is to be processed.

Retrieval of data for such complex analyses as those performed by OLAP systems and other business intelligence or reporting systems can be an extremely complicated and highly time-consuming process. Because the worth of these systems lies in their capability to produce complex results on demand, their value cannot be fully realized if results are slowed due to inefficiencies in the processing platform or if the system is too complex for the user.

SUMMARY OF THE INVENTION

It is therefore desirable to provide a reporting platform from which a user can access information from large databases in as efficient and convenient a manner as possible. In addition, it is desirable to establish a procedure for running a report that allows the report to be quickly and easily regenerated.

Accordingly, an embodiment of the invention provides a method of searching a metadata repository used to store metadata objects relating to data stored in at least one data storage device of a decision support system. The method may include submitting to an object server a search object having search criteria established by a requestor. The method may further include, transferring the search object to a metadata server and searching the metadata repository for objects meeting the search criteria. A search result object, including the objects meeting the search criteria, may then be returned to the requestor.

A method according to embodiments of the invention may further comprise searching the object server for objects meeting the search criteria. The step of searching the object server may be carried out responsive to identification of a predetermined local search attribute in the search object.

In embodiments of a method of searching a metadata repository according to the invention, the requestor of a search may be a user of the decision support system. The requestor may alternatively be a module of the decision support system.

The metadata stored as metadata objects in a metadata repository of an embodiment of the invention may include one or more types of information from various modules, reports, documents, prompts, filters, templates, metrics, custom groups, consolidations, searches, attributes, facts, hierarchies, transformations, partitions, tables, functions, users, database instances, schedules, and other types of data objects.

The step of searching the metadata repository of a method of the invention may include forming at least one SQL query using the search criteria of the search object and executing the at least one SQL query to search the metadata repository.

A method of searching a metadata repository according to an embodiment of the invention may further comprise determining if a result folder has been created for the search object. If no result folder has been created for the search object, the method may comprise creating a result folder. The search result object may then be stored in the result folder. The search result object may also be stored in the metadata repository.

An embodiment of the invention provides a system for retrieving metadata relating to data stored in at least one data storage device of a decision support system having a user engine, an analytical engine, and a query engine. The system may comprise an object server having a server interface portion in communication with at least one of the user engine, the analytical engine, and the query engine. The system may also comprise a metadata repository containing the metadata in the form of metadata objects. The system may further comprise a metadata server in communication with the object server and the metadata repository. The metadata server includes a metadata search engine configured for searching the metadata repository for metadata objects meeting search criteria supplied to the metadata server by the object server.

Other objects and advantages of the invention will be apparent to one of ordinary skill in the art upon reviewing the detailed description of the invention.

DETAILED DESCRIPTION OF PREFERRED EMBODIMENTS

Figure 1:
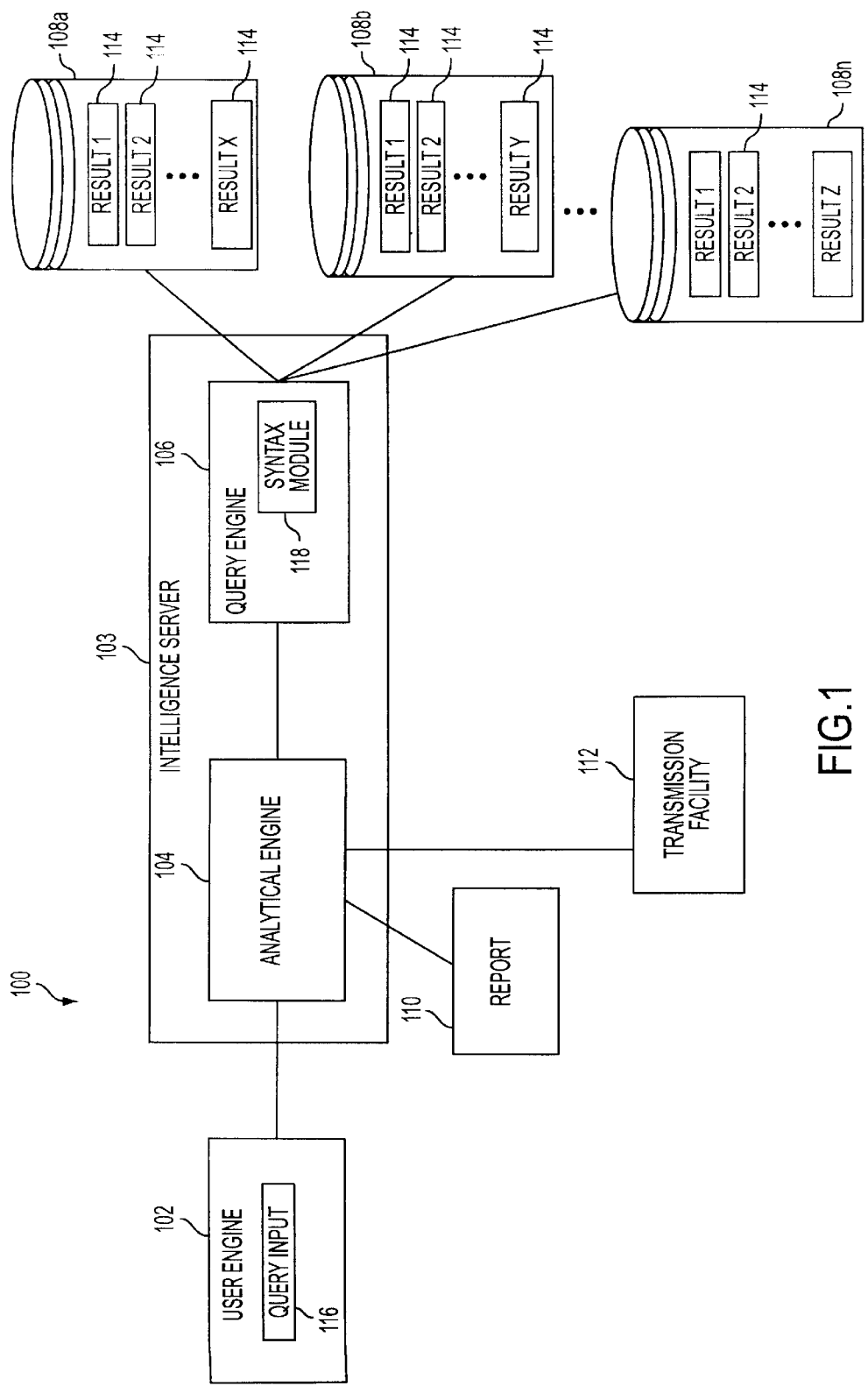
FIG. 1 is a block diagram illustrating an architecture for a system according to an embodiment of the invention.

To better understand the metadata retrieval system of the invention, an embodiment of a decision support system with which it may be used is provided. FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybas™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 Patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 Patent. The platform of FIG. 1 may have many other uses, as described in detail with respect to the MicroStrategy 7 and 7.1 platform, the details of which will be appreciated by one of ordinary skill in the reporting and decision support system art.

Figure 2:
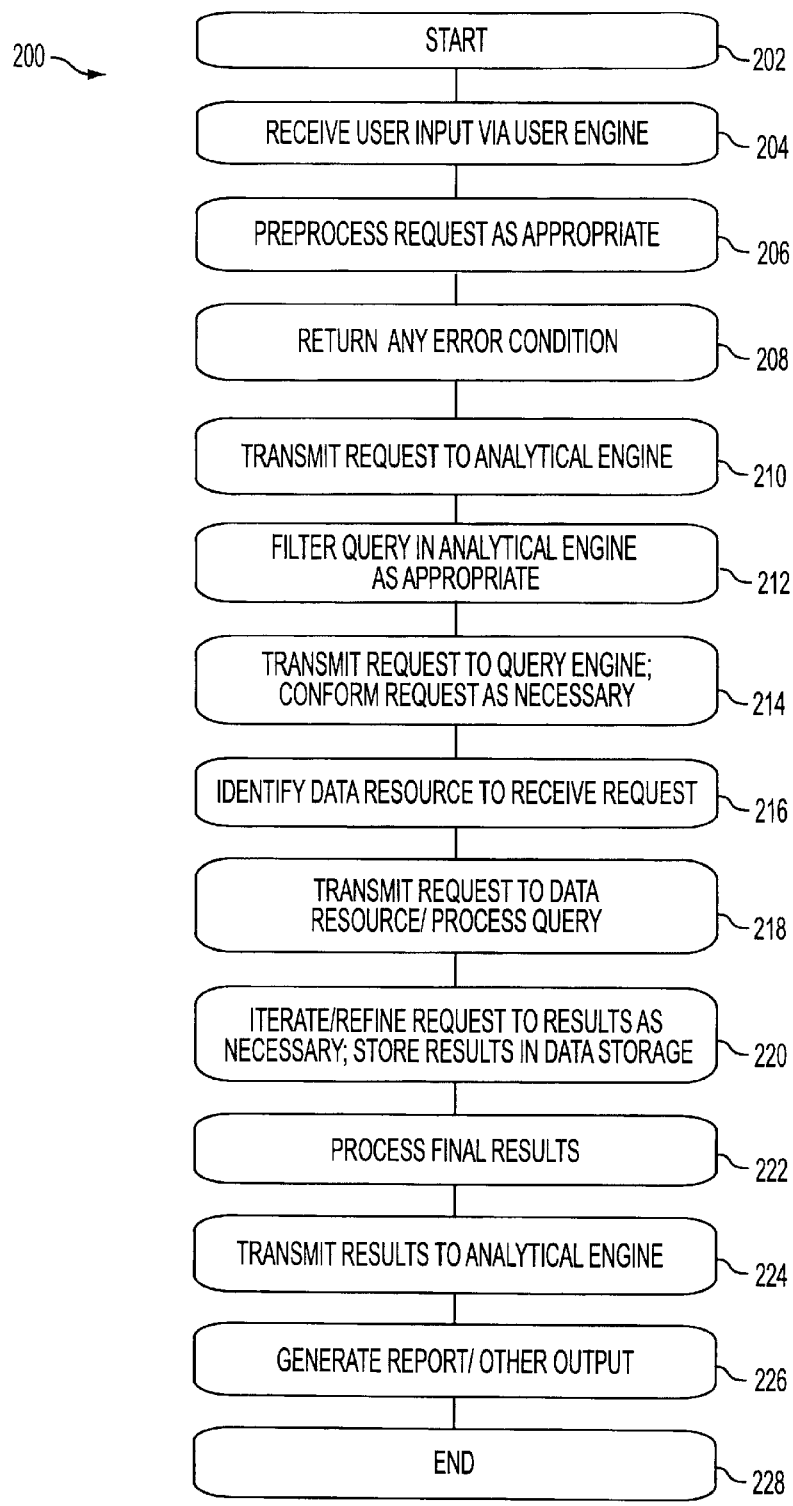
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b . . . 108n. In step 216, one or more appropriate databases or other resources within the data storage devices 108a, 108b . . . 108n may be identified to be accessed for the given query.

In step 218, the query may be transmitted to the data storage devices 108a, 108b . . . 108n and the query may be processed for hits or other results 114 against the content of the data storage devices 108a, 108b . . . 108n. In step 220, the results 114 of the query may be refined, and intermediate or other corresponding results 114 may be stored in the data storage devices 108a, 108b . . . 108n. In step 222, the final results 114 of the processing of the query against the data storage devices 108a, 108b . . . 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Embodiments of the invention may include a metadata repository that can be used to store the schema for data storage 108a, 108b . . . 108n. The metadata repository may be a relational database separate and distinct from the data storage database. The schema stored in the metadata repository may include data and records configured by the user to provide searchable information about the data in the data storage 108a, 108b . . . 108n. The metadata may include one or more types of information from various modules, reports, documents, prompts, filters, templates, metrics, custom groups, consolidations, searches, attributes, facts, hierarchies, transformations, partitions, tables, functions, users, database instances, schedules and other types of data objects.

Figure 3:
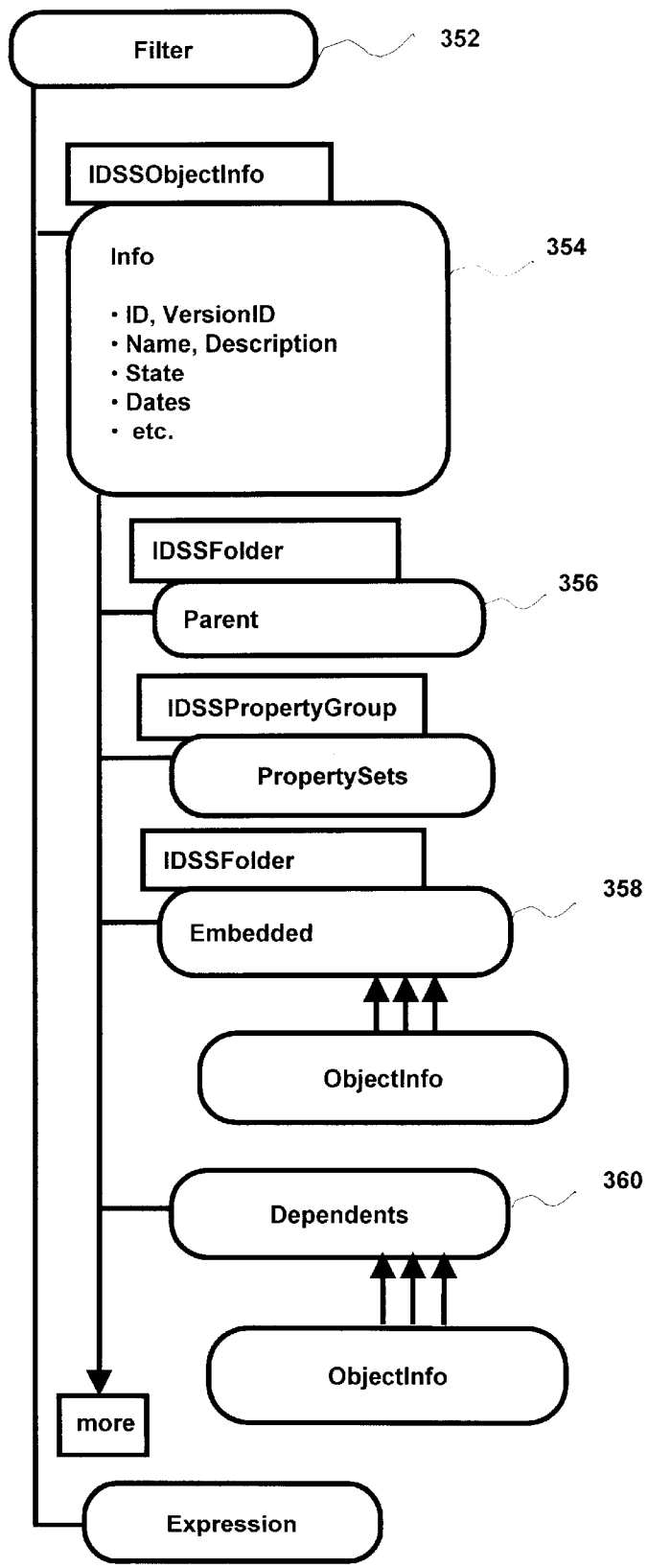
FIG. 3 is a schematic map of a representative metadata object storable in a metadata repository of an embodiment of the invention.

The metadata are preferably organized in a manner that facilitates searching. To accomplish this, the metadata may be organized into a system of objects having at least some common attributes. A map of a representative metadata object 308 is shown in FIG. 3. Metadata objects may start with a type-specific interface 352 that has the name of the type of the object. Metadata objects may further include an information object 354. The metadata object definition or expression 356 preferably includes information that is specific to the particular type of metadata object. Information object 354 includes properties that are common to metadata objects. These properties include one or more of a unique identifier, a version identifier, state, dates, comments, and other properties. The information object 354 also includes embedded object information 358 providing information on other metadata objects that contain or refer to this object. The information object 354 also includes dependents information 360 that provides the metadata objects that appear in this metadata object's definition or expression.

Figure 4:
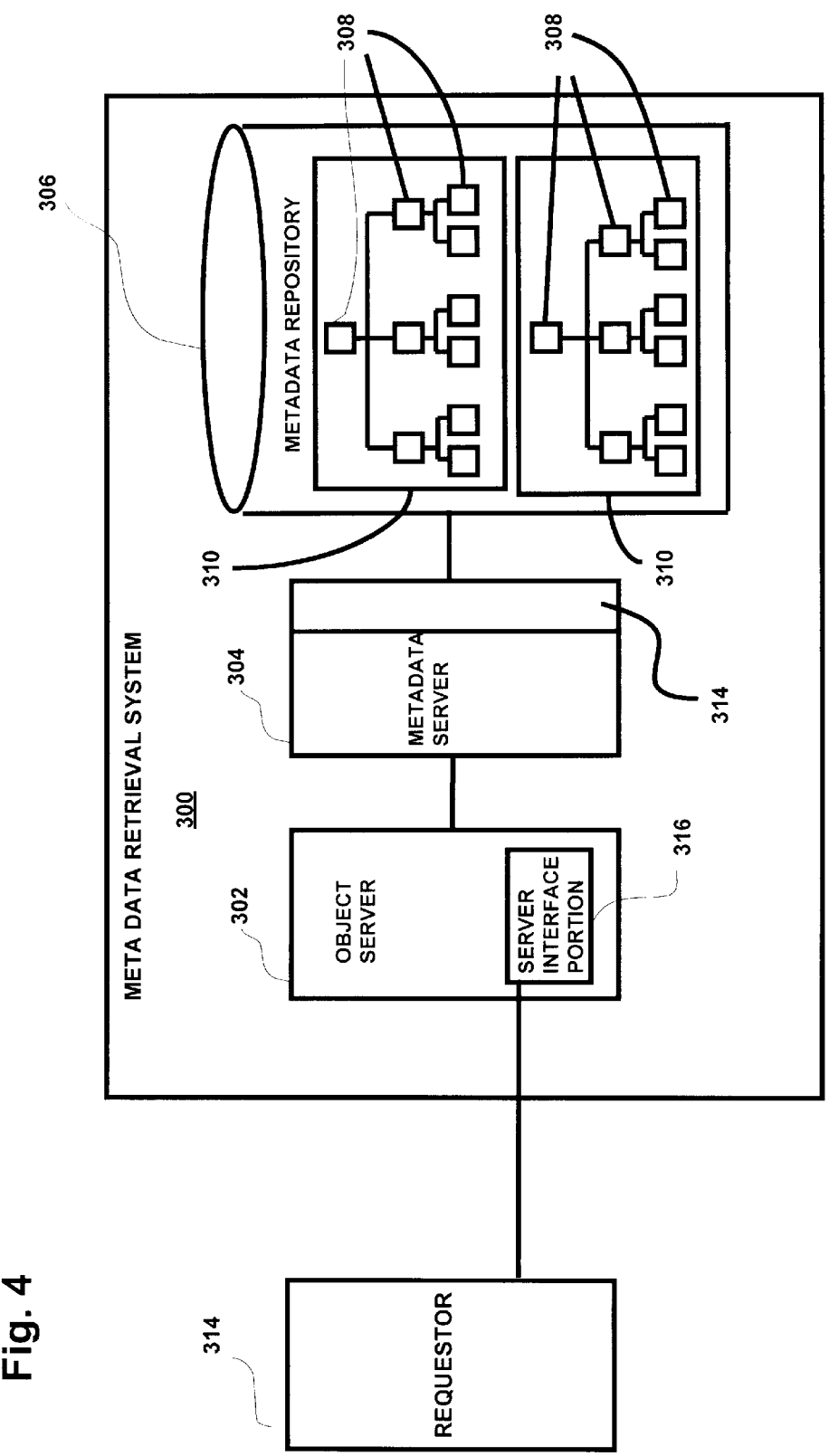
FIG. 4 is a block diagram illustrating a metadata retrieval system according to an embodiment of the invention.

Embodiments of the invention may include a metadata retrieval system configured for efficient retrieval of data from the metadata repository. FIG. 4 illustrates a metadata retrieval system 300 according to one embodiment that includes an object server 302, a metadata server 304 and a metadata repository 306. The object server 302 includes a server interface portion 316 that may be configured to communicate with any or all of the user engine 102, analytical engine 104 and query engine 106. Alternatively, the metadata retrieval system 300 may be integrated into, for example, the user engine 102.

The metadata repository 306 may include or interface to one or more relational databases or another structured database stored on a hard disk, an optical disk, a solid state device or another similar storage media. When implemented as databases, the metadata repository 306 may include or interface to, for example, an Oracle™ relational database, a DB2 database, a Sybase™ database, or another data storage device or query format, platform or resource such as an OLAP format, a SQL format, a SAN, or a Microsoft Access™ database.

The metadata objects are collected into groups or projects used by users to accomplish particular related tasks with regard to extracting desired information from the primary database. The metadata repository 306 may contain a plurality of metadata objects 308 organized in one or more folder hierarchies 310. The organization of these folder hierarchies 310 may be established by the user in a manner determined by the user to best facilitate understanding and retrieval of the metadata objects 308. Nevertheless, when the number of objects 308, folder hierarchies 310 or both is large, the user is likely to have difficulty locating a particular object.

Accordingly, the metadata server 304 of the metadata retrieval system 300 includes a metadata search engine 312. The metadata search engine 312 provides the retrieval system 300 with the capability to search the metadata repository 306 in a highly efficient manner. The metadata search engine 312 uses search criteria provided in the form of a search object. The search object may be constructed by a requestor 314, which may be a user or another module of the decision support system 100 as will be discussed in more detail below.

The search object may be essentially a collection of one or more search parameters determined by the requester. To facilitate reuse of searches, both the search parameters and the search result may be represented as metadata objects. The search description and the search result can thus be separately saved by the requester into the metadata repository 306 for possible reuse at a later date.

Figure 5:
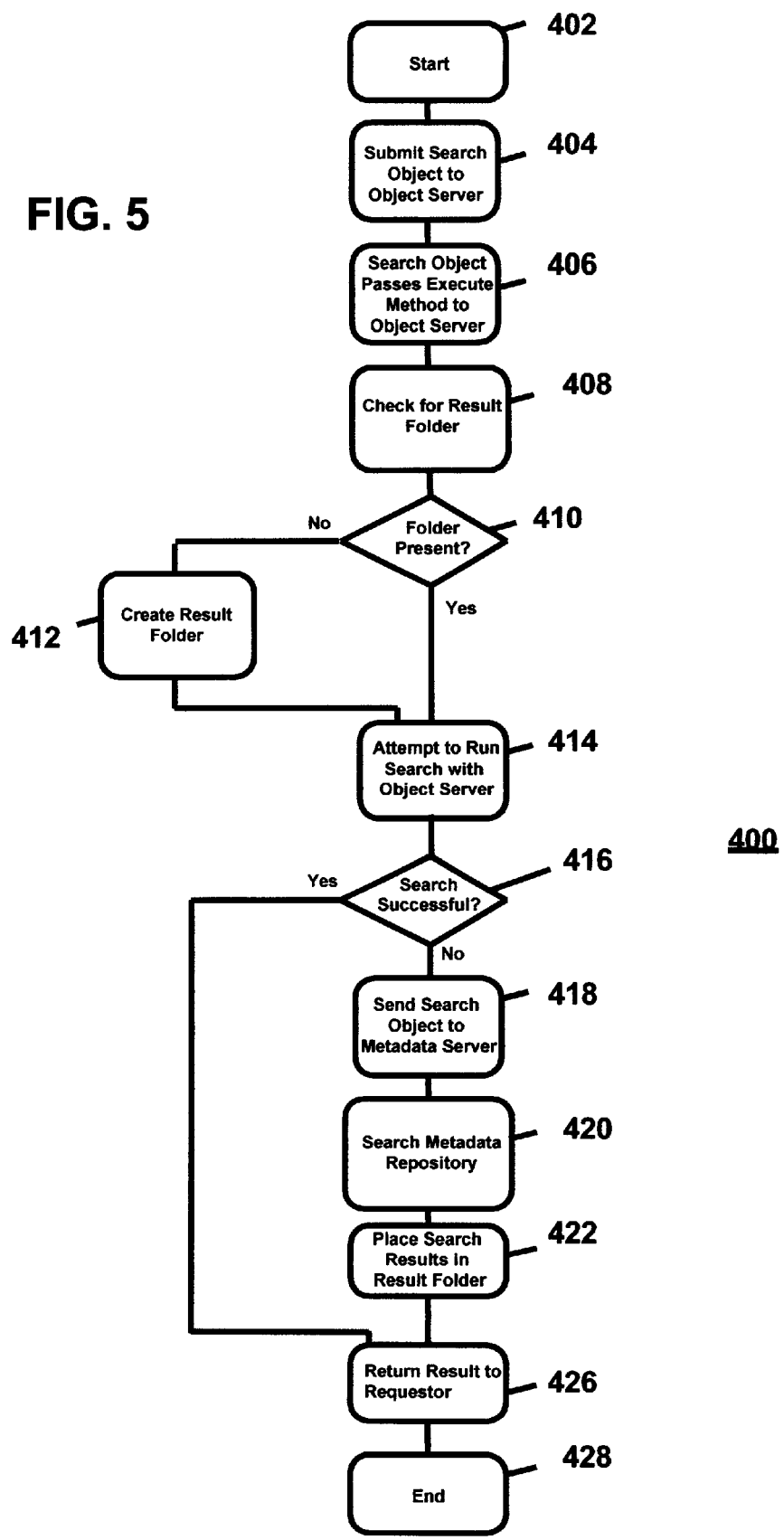
FIG. 5 is a flow diagram illustrating steps performed by a process using a metadata retrieval system according to the invention.

FIG. 5 is a flowchart illustrating the steps in a search method 400 according to an embodiment of the invention. Processing begins at step 402. At step 404, a requester 314 submits a search object to the object server 302 of the metadata retrieval system 300. The object is submitted to the object server 302 by the requester 314. The requester 314 may be a user who submits his search request to the metadata retrieval system 300 through the user engine 102. Alternatively, the requester 314 may be a server in the decision support system 100 that requires a search for objects to construct a prompt to the user through the user engine 102. A server in the decision support system 100 may also require a search for the purposes of an internal check prior to deletion of an object, as will be discussed in more detail hereafter.

Figure 6:
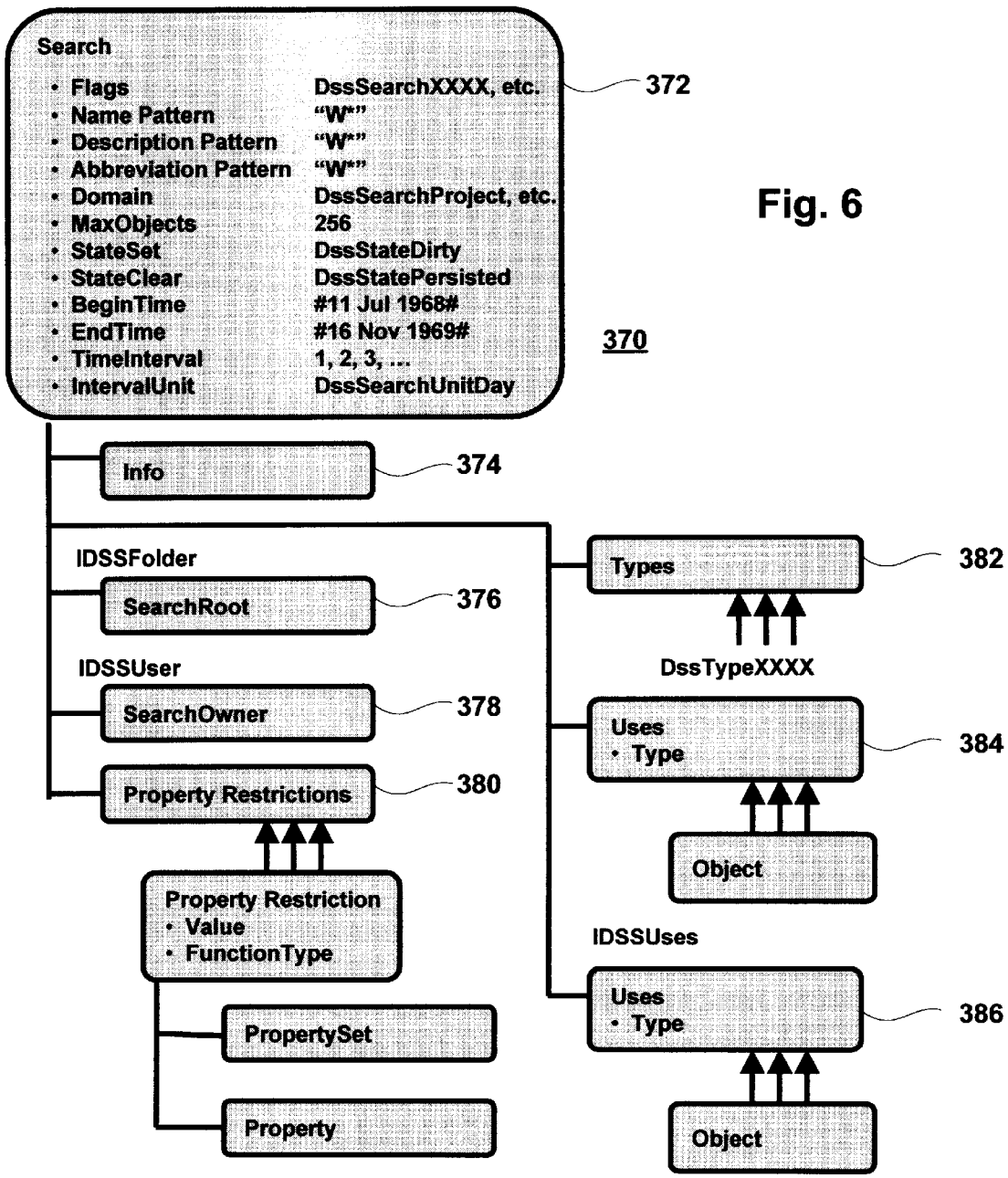
FIG. 6 is a schematic map of a representative search object usable by embodiments of the invention.

The search object is assigned various properties that define the execute method of the search. FIG. 6 illustrates a map of a representative example of a search object 370. The search object 320 may include a flag block 372 with values specifying certain limitations on the manner in which the search is to be conducted. The search object may also include an information object 374, a root search object 376, a search owner identification object 378, a property restriction object 380, a type object 382, a Uses object 384, and a UsedBy object 396. These objects are used to specify the restrictions and search criteria used to screen the objects in the metadata repository 306. These screening criteria are discussed in more detail below.

At step 406, the search object passes the execute method to the object server 302. At step 408, the object server 302 executes a check to determine if a result folder has been created by the requestor 314. At step 410, the process branches depending upon the determination made in step 408. If no folder is present, the object server 302 creates a result folder at step 412. The object server 302 then carries out step 414. If a folder is present, the object server 302 proceeds directly to step 414. At step 414, the object server 302 may attempt to perform the search using objects already loaded into the object server 302. If the requestor has requested a local search (i.e., restricted the search to loaded objects), the object server 302 is able to perform the search. The object server 302 may also be configured to determine whether enough information has been loaded to carry out the search even without a restriction imposed by the requestor 314. At step 416, the process may branch depending upon whether the search by the object server 302 is successful. If the search is successful, the search result is returned to the requestor 314 at step 426 and the process ends at step 428. If the search is not successful, the object sever 302 sends the search object to the metadata server 304 at step 418. The metadata server 304 uses the metadata search engine 314 to search the metadata repository 306 using the criteria in the search object. As part of this step, the metadata search engine 314 may use the criteria in the search object to construct one or more SQL queries, which are then executed to search the metadata repository 306. The search results may then be placed in the result folder at step 422. The search results stored in the result folder may include the metadata objects found in the search or merely a list identifying the objects found. At step 426, the metadata server 304 returns the results to the requestor 314 via the object server 302 and the process ends at step 428.

The metadata retrieval system 300 can be used to conduct searches based on search objects having a variety of properties that define the search criteria. The search object has a Long-valued property called Flags. This property is used as a bit vector to hold various Boolean modifications to the search. Multiple Flags values can be used to set several flags simultaneously. A default may be established wherein the search will retrieve all objects that match the search criteria. If a user wishes to restrict the search to only return visible objects, for example, then the user would set a flag signaling to "search visible only."

The metadata search engine 316 may be configured to use a variety of screening criteria types. The following paragraphs describe some of the criteria types that may be used by the metadata search engine 316 and the search object to restrict a search in a method according to the invention.

A preferred way to restrict a search is to restrict the type of objects that are to be recovered. The search object used by the invention may have a collection property called Types that contains a collection of enumeration values. If the collection is non-empty, then the search will only retrieve objects whose type is in the collection. If the collection is empty, then objects of any type can be retrieved. The system may support typical collection methods such as Add, Clear, Count, Item, and Remove.

A search object may specify the name of the object(s) to be recovered by setting a NamePattern property of the search object. If this property is set to anything other than an empty string, then only objects having the desired name are retrieved. The name matching function need not be case sensitive. The name can be requested literally, or it can be requested using standard SQL Wild-Card characters. This assumes that a flag has been set indicating that Wild-Card characters are to be useable. The capability to discern abbreviations may also be provided.

In embodiments of the invention, the search object may specify a search on the textual material that may be provided in the description portion of the metadata objects in the metadata repository.

Another preferred manner of restricting a search in embodiments of the invention is to specify a dependency restriction on objects found in the search. In other words, searches can retrieve objects based on the fact that they are dependent on another object. By definition, a metadata object A is dependent on metadata object B if object A refers to Object B in any way at all in its definition. In other words, A depends on B if a user, given the definition of A, could infer the existence of B. It is possible for two objects to be mutually dependent, or for A to be dependent on B while B is not dependent on A. Dependency only relates to the usage of B in A's definition. It does not relate to the usage of B in A's object information data. In practice, this means that an object A is not considered to be dependent on its parent folder. An object can also be indirectly dependent on another object if the one object is used indirectly by the other. An object A uses an object C indirectly if the existence of C could not be inferred from the definition of A, but A uses B and B uses C.

These relationships allows the search engine to perform recursive searching of the metadata folder hierarchies 310. In an embodiment of the invention, a search object may include a collection property called Uses that provides the capability of returning an object that uses a given object. If the collection is non-empty, then the default behavior is to restrict the search so that it only returns objects that directly use all of the objects in the collection. Setting the recursive flag causes the search to return all objects that use the given object(s) indirectly. The Uses collection also contains a Type property. This property may be set to specify that only objects using objects of a given Type are to be retrieved. This allows, for example, the retrieval of all objects that contain prompts. Additional flags can be supplied to control the effect of the Uses collection. For example, one flag may be set that changes the search so that it returns objects that use any one of the objects in the collection, instead of all the objects in the collection. If the Type property is set as well, then objects that use one of the listed objects or any object of the given Type is returned.

The UsedBy collection properly restricts the search to objects used by all of the objects in the collection and thus is the reverse of the Uses collection. Flags similar to those described above may be used in conjunction with the property. Thus, the search can be limited to objects used by only one of a collection of objects, or a recursive search may be conducted by setting a flag to retrieve all objects that use a particular object either directly or indirectly. A search that adds a single UsedBy object to the collection and imposes no other restriction is not useful, because it will return exactly the same objects that appear in the object's dependent collection. However, the search object allows additional restrictions and may be much more efficient than accessing multiple dependent collections if a user wishes to perform a recursive search of dependents.

The "domain" of a search is the space where the search is conducted for objects that meet the search's criteria. The search object may specify the domain of the search. This allows the requestor a degree of control over the length of time it takes to perform the search. However, if the search domain is restricted, it must be recognized that there is a possibility that other objects that would satisfy the search criteria may not be found.

The search domain may typically be limited to one of the three following areas. A "Local" search is restricted to those objects and parts of objects that are already loaded in the local object server. This type of search may be conducted very quickly because it involves no network traffic and no database access. It will, however, miss any objects that have not been loaded on the local object server. Thus, a requestor should use a local search restriction only if it is certain that the needed objects have already been loaded.

A "Project" search is performed on all of the objects in the current project and also on objects in the current projects configuration. If the object server was set up to access an configuration only, then this setting will only access objects from the configuration.

A "Repository" search is performed on all objects in the current project and configurations found in a specified repository. This restriction is not necessary if the metadata is located in a single repository (i.e., is not distributed among multiple repositories).

If the user does not set the Domain property, then the search may be performed in the project domain by default. This will cause a search among all of the objects that could be loaded by the object server being used. If a user has created an object that has not yet been loaded into the metadata, then that object would be included in a local search but would not be included in a project or repository search.

A requestor can also specify a restriction based on one or more DSS properties. The search will match only objects that satisfy all of the DSS property restrictions. Each property restriction is represented by a property restriction object. The simplest kind of property search merely specifies the characteristics of the property in which the requestor is interested. These characteristics may be represented by object values. The search will retrieve those objects having a specified value or retrieve objects based on a default property value. The requestor may specify a constant value or a range of values based on the use of a comparison operator. The user may also specify that the search should return all templates that overwrite the property value for a particular object.

The metadata search engine 314 may be configured so that a DSS property search will only retrieve objects for which the property is defined. If a user asks to see all objects that have a default value of a property, the search will return those objects that explicitly record that they are using the default value. This discriminates those objects that use the default value only because the object has not been explicitly supplied its own value.

A search conducted by the metadata search engine 314 may be restricted to a single folder within the metadata repository by specifying a SearchRoot property. A recursive search will be conducted if a flag is raised that specifies that all sub-folders of a given folder be searched as well. The SearchRoot property differs from the UsedBy property in that the recursive search using the SearchRoot property will only go down to other folders. It will not return imbedded objects, objects pointed to by shortcuts, or objects used by objects found in the folders. In contrast, the UsedBy property will return all of these.

Specialized search criteria may be used to find specific user objects based on user identification information. This criteria can be used to authenticate access to the correct user. In addition, each object may record a particular object as its owner. A search can therefore be restricted to return objects that belong to a specific user by setting a SearchOwner property. This property may be set to NULL to remove the restriction.

When a metadata object is instantiated in memory, it is given a bit-vector property called State. This property may contain bits to record information regarding such qualities as whether the object is fully loaded or whether the object has been modified since it was last loaded. When searching local objects (i.e., objects in the local object server), it is possible to limit the search to objects whose State property has certain bits set, or which have certain bits clear. This function is useful to determine which objects have not been saved since they were modified.

Each metadata object may record two dates: Creation-Time and ModificationTime. The first of these is the time when the object was saved for the first time. The second is the most recent time that the object was saved. The dates are stored internally in absolute time (GMT), but are converted into local time before being given to the user. The metadata retrieval system 300 may use two ways to limit a search by date. In one case, the requester specifies a range of dates by specifying the first and last date of the search. In the other case, the user specifies an interval of time using a number and a unit of time. In the latter case, objects are found whose dates lie in the most recent interval's given length. In both cases, the search defaults to using the CreationTime, but can be switched to the ModificationTime by setting an appropriate flag. A search on an absolute range of time is defined by setting Begin Time and End Time properties to the start and end of the period of time. The search is inclusive in that an object will match the search criterion if its date is exactly the same as the Begin Time or End Time.

The search object may have additional functionality beyond the above-described search criteria. For example, a Clear function can be used to remove all restrictions on the search object. This leaves the search object in its default state. Executing the search at this point would return all of the objects available to the object server. The search object may also include limits on the number of objects retrieved. This allows the requestor to retrieve search results in several blocks. The requester may also request that the search result be appended to an existing search folder by specifying the folder that they wish to use. The additional objects are appended. Alternatively, the requester may cause the folder to be emptied prior to the search result being appended. This functions as an overwrite to the information in the folder.

A search folder is a simple first-class object. Like an ordinary folder, it is a mixed-type collection of metadata objects. The search folder, however, is specifically identified as such to discriminate it from ordinary folders. Because the search folder is a metadata object, it has an Info property. This can be used to give a search a folder, a name, and all of the usual properties. In particular, a user can save a search folder to metadata. The requestor may also count, review, move or remove objects from a search folder.

The metadata retrieval system 300 may be used to provide search support to the decision support system 100 in several instances. The simplest instance is where the user wishes to perform a search. The user submits the search request through the query input module 116 of the user engine 102, which may formulate a search object and submit it to the object server 302. The metadata search results may be passed back to the user engine 102 by the object server.

Under certain circumstances, when a report request is made by a user, it is desirable to return a prompt to the user interface to request that the user provide additional limiting information. For this purpose, part of the definition of an object in a report can be replaced with a prompt object. When the report is executed, the user is prompted to provide the missing parts of all the prompts found in the report's objects. In order to provide the user with a list of appropriate responses to the prompts, the decision support system 100 conducts an internally directed search to find the possible prompt responses in the metadata repository 306. The appropriate server within the decision support system 100 communicates the search object to the object server 302 and the search may be conducted in accordance with the process described in FIG. 4. The returned result is a metadata object that lists for the user the responses found in the search.

Another internally initiated search may be conducted by the system 100 when a request is made to delete an object. In this case, a pre-structured search object is submitted to the object server 302. The pre-structured search includes criteria that will allow the determination of whether the object to be deleted is used by any other object. This allows the prevention of inadvertent deletion of objects that are used by other objects that may, for example, be required for certain reports. The recursive search capabilities discussed above are particularly useful in performing this function.

Other embodiments and use of the invention will be apparent to those skilled in the art from consideration of the specification and practice of the invention disclosed herein. The specification and examples should be considered exemplary only. The scope of the invention is only limited by the claims appended hereto.

In particular, it will be understood that the invention is not limited to the decision support systems discussed herein. The methods and systems of the invention may be used in any reporting system that uses metadata to facilitate retrieval of information from a large database or network of databases. As used herein, reporting systems include all business intelligence an decision support systems.

What is claimed is:

1. A method of searching a metadata repository used to store metadata objects relating to data stored in at least one data storage device of a decision support system, the method comprising the steps of:

submitting to an object server a search object having search criteria established by a requester wherein the search criteria is used to screen the metadata objects in the metadata repository;

transferring the search object to a metadata server;

recursively searching the metadata repository for metadata objects meeting the search criteria of the search object; and returning to the requestor a search result object including at least a portion of each of the metadata objects meeting the search criteria.

2. A method according to claim 1 wherein the requester is a user of the decision support system.

3. A method according to claim 1 wherein the requester is a module of the decision support system.

4. A method according to claim 1 further comprising the step of searching the object server for objects meeting the search criteria responsive to identification of a predetermined local search attribute in the search object.

5. A method according to claim 1 wherein the step of searching the metadata repository includes:

forming at least one SQL query using the search criteria of the search object; and executing the at least one SQL query to search the metadata repository.

6. A method according to claim 1 further comprising the steps of:

determining if a result folder has been created for the search object;

creating a result folder responsive to a determination that no folder has been created for the search object; and storing the search result object in the result folder.

7. A method according to claim 1 further comprising the step of:

storing the search result object in the metadata repository.

8. A system for retrieving metadata relating to data stored in at least one data storage device of a decision support system having a user engine, an analytical engine and a query engine, the system comprising:

an object server having a server interface portion in communication with at least one of the user engine, the analytical engine and the query engine;

a metadata repository containing the metadata in the form of metadata objects; and a metadata server in communication with the object server and the metadata repository, the metadata server including a metadata search engine configured for recursively searching the metadata repository for metadata objects meeting search criteria supplied to the metadata server by the object server.

9. A system according to claim 8 wherein the object server is configured to receive a search object from at least one of the user engine, the analytical engine and the query engine, the search object comprising a set of search criteria.

10. A system according to claim 9 wherein the object server is further configured to search the object server for objects meeting the search criteria in response to the search object including a local search request.

11. A system according to claim 8 wherein the metadata are stored in a relational database and the metadata search engine is configured to formulate SQL queries for searching the metadata repository.

12. A system according to claim 8 wherein the metadata objects in the metadata repository are stored in at least one folder hierarchy and wherein the metadata search engine is configured to filter objects in the metadata repository based on search criteria supplied by the search object.

13. A system according to claim 12 wherein the metadata search engine is configured to conduct recursive searches of the at least one folder hierarchy responsive to the presence of predetermined search criteria in the search object.

14. A processor-readable medium comprising code for execution by a processor to search a metadata repository used to metadata objects relating to data stored in at least one data storage device of a decision support system, the medium comprising:

code for receiving a search object having search criteria established by a requestor wherein the search criteria is used to screen the metadata objects in the metadata repository;

code for transferring the search object to a metadata server;

code for recursively searching the metadata repository for objects meeting the search criteria of the search object; and code for returning to the requester a search result object including the objects meeting the search criteria.

15. A medium according to claim 14 further comprising:

code for determining if a result folder has been created for the search object;

code for creating a result folder responsive to a determination that no folder has been created for the search object; and code for storing the search result object in the result folder.

16. A medium according to claim 14 further comprising:

code for storing the search result object in the metadata repository.

17. A medium according to claim 14 further comprising:

code for searching the object server for objects meeting the search criteria, the step of searching the object server being carried out responsive to a local search attribute in the search object.

18. A medium according to claim 14 wherein the code for searching the metadata repository includes code for forming at least one SQL query using the search criteria of the search object; and code for executing the at least one SQL query to search the metadata repository.

* * * * *